March 18, 1958 G. A. STAAF 2,827,268
LIQUID TRANSPORTING APPARATUS
Filed Dec. 7, 1953 4 Sheets-Sheet 2

INVENTOR:
G. A. STAAF
BY: Moore & Hall

March 18, 1958  G. A. STAAF  2,827,268
LIQUID TRANSPORTING APPARATUS
Filed Dec. 7, 1953  4 Sheets-Sheet 4

United States Patent Office 2,827,268
Patented Mar. 18, 1958

2,827,268

LIQUID TRANSPORTING APPARATUS

Gustaf Adolf Staaf, Vasteras, Sweden

Application December 7, 1953, Serial No. 396,539

4 Claims. (Cl. 259—96)

The present invention relates to an apparatus for transporting liquid from a lower layer of a body or store of liquid to a higher layer thereof, for example from the bottom of a lake up to the free surface of the lake.

The apparatus according to the invention is primarily intended for use in lakes and water courses during wintertime for melting ice already formed and for preventing ice-formation, the effect of the apparatus being based on the fact that in a lake coated with ice or on which ice is being formed the water has a higher temperature at the bottom than at the free surface, the maximum temperature at bottom being about +4° C., at which temperature, as is well known, water has its greatest density.

The apparatus provided according to the invention is particularly characterised in that it comprises a float which carries a motor-driven centrifugal pump the impeller of which is suspended in a vertical shaft and is enclosed in an impeller housing provided with a centrally arranged vertically extending suction pipe and with an annular outlet passage.

In a particularly suitable embodiment of the apparatus according to the invention there are provided in the annular outlet passage of the impeller housing, spaced around the circumference thereof, a plurality of guide blades which are so shaped and directed as to be able to brake, with the smallest possible losses, the rotating movement which the water has obtained during its passage through the impeller and to give the jets of water leaving the impeller between any two guide blades a radial outlet direction. In this manner is neutralized the tendency to rotate in the water which the apparatus otherwise would have and which would be inconvenient in connection with the anchoring of the apparatus by means of a rope or wire.

A suitable embodiment of the invention is illustrated in the accompanying drawings.

Figure 1:
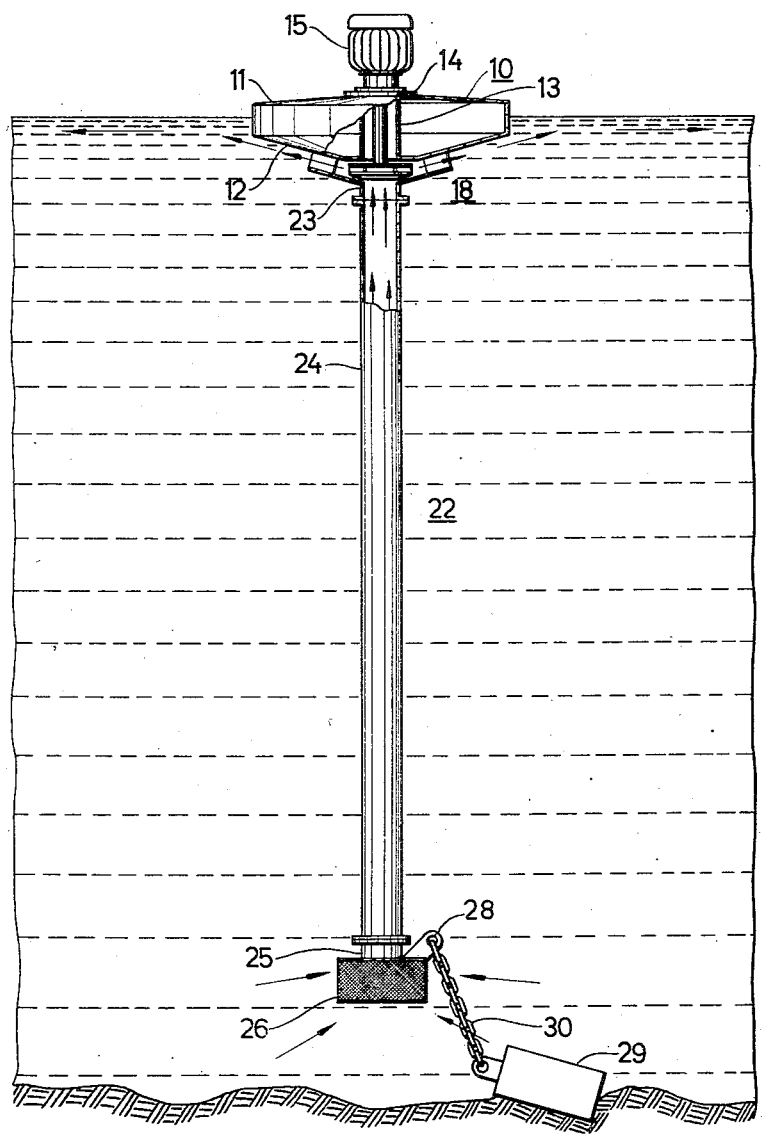
Figure 1 is a side-view of the apparatus with certain parts broken away.
Figure 2:
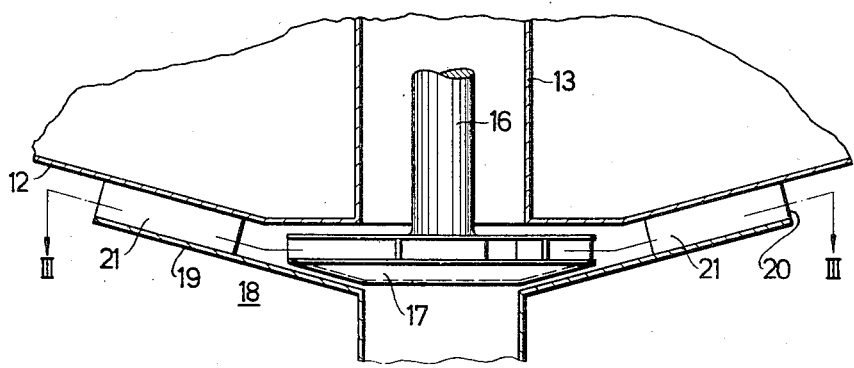
Figure 2 shows, on a larger scale, an axial section through the impeller housing and the adjacent portions of the float and suction pipe.

In the drawings, the reference numeral 10 designates a float in the form of a low cylinder having an upper end surface 11 curved slightly upwardly and a lower end surface 12 in the form of a downwardly directed truncated cone with a comparatively large top angle. According to the drawing, the generatrix of the cone forms an angle of about 70° with the axis of the cylinder. A pipe 13 disposed coaxially with the cylinder connects together the upper and lower end surfaces of the float and forms a free vertical passage through the float. Arranged centrally on the upper surface 11 of the float is a mounting ring 14 for an electric driving motor 15 having a vertical shaft. On an extension 16 of the motor shaft is mounted a pump impeller 17 which operates in an impeller housing 18. The upper limiting wall of the impeller housing 18 is formed by the conical bottom 12 of the float. The lower limiting wall 19 of the impeller housing, which is substantially parallel with the upper limiting wall 12, forms together with the latter an annular outlet passage or outlet opening 20 in which are arranged, spaced around the circumference, a plurality of vertically and radially directed guide blades 21. In the embodiment shown, the diameter of the impeller housing 18 is considerably smaller than the diameter of the float 10.

Opening centrally into the impeller housing 18 is a suction pipe generally designated 22, said suction pipe 22 being suspended in the lower wall 19 of the impeller housing. The suction pipe 22 is composed of a short pipe socket 23 which is rigidly connected with the impeller housing, an intermediate pipe 24 which is detachably secured to the pipe socket, and an end pipe 25 which is detachably secured to the intermediate pipe. The end pipe 25 carries at its lower end a bottom strainer 26. The said composite design has been selected to facilitate the mounting of suction pipes of different length on the impeller housing.

Figure 3:
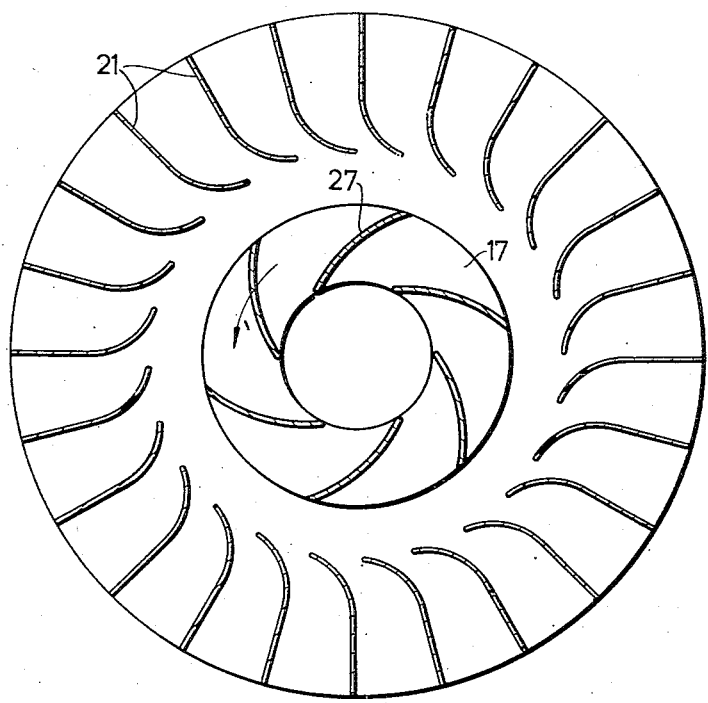
Figure 3 shows, on the same scale, a horizontal section through the impeller and the impeller housing on the line 3—3 in Figure 2.

In the embodiment shown the blades 27 of the impeller 17 are curved and arranged to slope backwardly with respect to the direction of rotation indicated with an arrow (Figure 3). Alternatively, the blades 27 may be straight and substantially radially directed, or else be curved so as to slope forwardly with respect to the direction of rotation, the shape and direction selected for the blades being dependent on the outlet speed which is desired. The guide blades 21 are shaped so as to give the jets of liquid discharged between adjacent guide blades a radial outlet direction.

To enable the apparatus to be anchored to the bottom of a lake or other store of liquid, there is provided on the bottom strainer 26 a lug 28 to which a weight 29 is secured by means of a rope or wire 30, see Figure 1. According to Figure 4, there may also be secured to the weight 29 a hauling wire 31, the other end of which is secured ashore. The electric cable 32 for the supply of current to the driving motor 15 is carried along the suction pipe 22, the anchor wire 30 and the hauling wire 31 to a suitable source of current, not shown.

Figure 4:
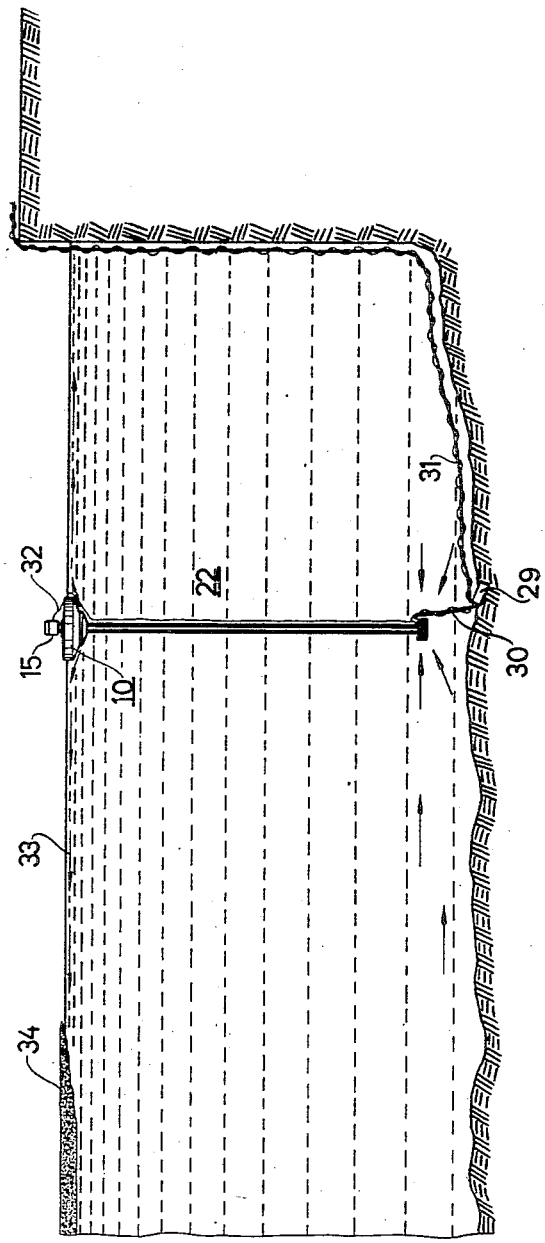
Figure 4 shows in side-view, on a reduced scale, the apparatus anchored in position near an embankment or quay.
Figure 5:
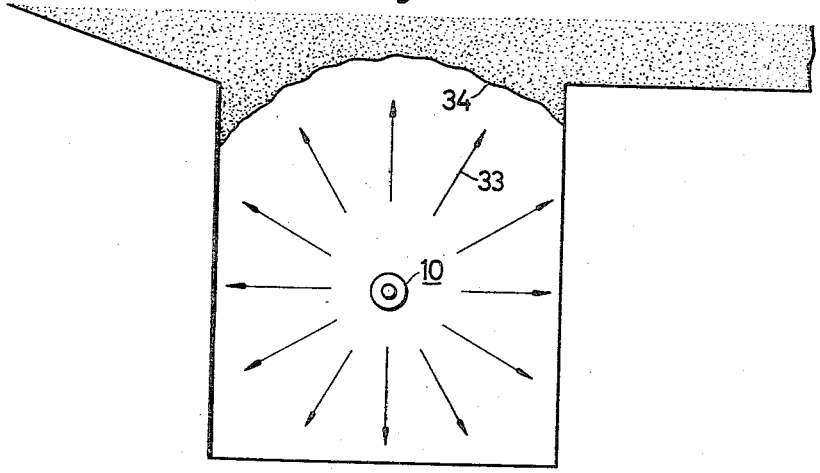
Figure 5 is a top view of a harbour basin in which an apparatus according to the invention has been anchored.
Figure 6:
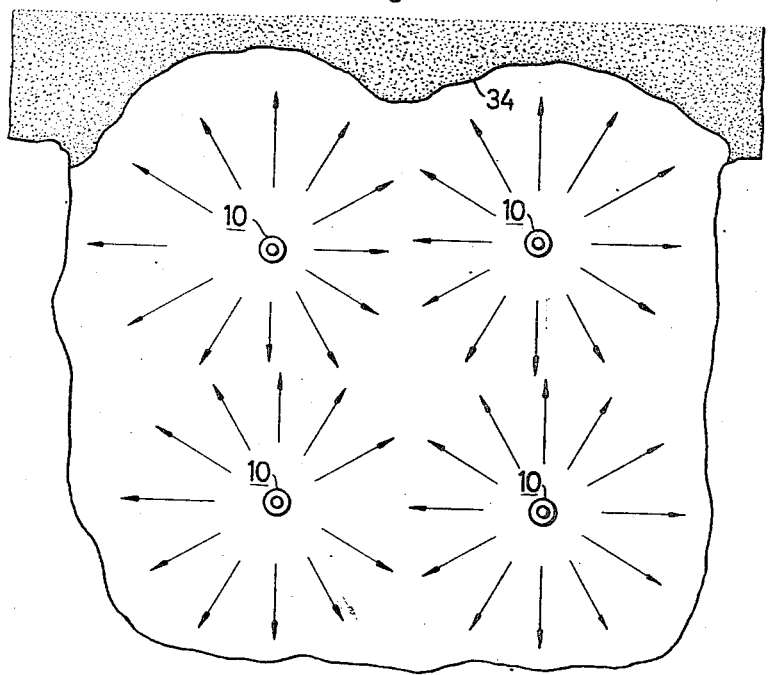
Figure 6 is a top view of a creek in which four apparatus according to the invention are anchored.

The manner of operation of the apparatus according to the invention should be clear from Figures 4 and 5. When the driving motor 15 has been started, warm bottom water is lifted through the suction pipe 22 up close to the surface and is pressed out radially in all directions through the annular outlet opening 20 of the impeller housing, as indicated with the arrows 33. A suitable outlet speed for the water is about 1 meter per second. The surface streams of warm water thus formed, which surface streams are active at a considerable distance from the float provided that the pumping apparatus is properly dimensioned, will melt the ice nearest to the float or prevent ice-formation, so that also in very cold weather a considerable area around the float is kept free from ice. The ice cover surrounding the area which is free from ice is indicated with the numeral 34 in Figure 4. If the area which should be kept free from ice is not particularly large, it will be sufficient to use a single pumping apparatus according to the invention, as shown in Figure 5, where the apparatus is shown anchored in a small harbour basin. According to Figure 6, which diagrammatically shows a creek of a lake or a water course used as a lumber store in a sawing mill, four pumping apparatus according to the invention are anchored at such mutual distances that their individual operative areas will overlap each other.

The apparatus according to the invention can be used also for other purposes than for melting a cover of ice or for preventing ice-formation within a limited area. Thus it may be used, for instance, for preventing waste oil, which covers the water surface, from entering a creek used as a swimming bath, for example. A suitable number of pumping apparatus are then anchored in a row which extends across the mouth of the creek, so that an outwardly directed surface stream is created in the water which interrupts the spreading movement of the film of oil and prevents the oil film from entering the creek.

During summer-time the pumping apparatus may be used for lifting the colder water existing nearer to the bottom up to the surface in such cases when the temperature of the water is considered to be too high.

The embodiment of the pumping apparatus according to the invention shown in the drawings may be modified in various ways. Thus the impeller shaft 16 need not necessarily be free-hanging but it may be guided at its lower end in a bearing, for instance a pockwood bearing, arranged in the vertical passage 13 of the float. Also in case a separate guide bearing is not provided, the play between the impeller 17 and the impeller housing 18 must not be so large as indicated in the drawing, in that the comparatively short impeller shaft 16 can readily be made so thick and rigid that the shaft will never reach its critical number of revolutions, where radical oscillations may be set up. Since, as a rule, however, the pump is dimensioned for a great delivery and a small pressure, no considerable losses occur even in case the play is large, wherefore for manufacturing reasons the play selected generally is comparatively large.

I claim:

1. An apparatus for transporting liquid in a store of liquid from a lower layer up to the free surface, for example from the bottom of a lake to the free surface thereof to inhibit ice formation adjacent said free surface, comprising a float which carries a motor-driven centrifugal pump, said pump having an impeller suspended from a vertical shaft at a position beneath the surface of said liquid and enclosed in an impeller housing, said housing having an annular outlet opening closely adjacent to and beneath the surface of said liquid, and a centrally arranged vertically depending suction pipe extending from said annular outlet opening to a position in said lower layer of liquid, said pump motor being mounted on the upper side of said float, and said impeller housing being arranged adjacent to the under side of said float with the impeller shaft carried down through a central tubular passage in the float.

2. An apparatus according to claim 1, in which the under side of the float substantially has the shape of a downwardly directed truncated cone having a comparatively large top angle, the said underside of the float forming the upper limiting wall of the impeller housing.

3. An apparatus according to claim 2, in which the lower limiting wall of the impeller housing is substantially parallel with the said upper limiting wall adjacent the said annular outlet opening.

4. A liquid pumping apparatus for transporting liquid from a lower layer up close to a free surface of a body of liquid to alter the temperature of the liquid adjacent said free surface, comprising a float member adapted for support on the surface of said body of liquid, a motor carried by the upperside of said float member above the surface of said liquid, a driving shaft coupled to said motor and extending through said float member, a liquid impeller coupled to said driving shaft adjacent the underside of said float member beneath and closely adjacent to the surface of said liquid, an impeller housing adjacent said impeller and defining an annular outlet opening adjacent the underside of said float member beneath and closely adjacent to the surface of said liquid, and a liquid inlet comprising an elongated inlet pipe coupled at one of its ends to said housing adjacent said impeller and extending for a substantial distance from said housing into said body of liquid, said inlet pipe being supported by said float member above and closely adjacent to the bottom of said body of liquid, and being open at the other of its ends to permit ingress of liquid thereto.

References Cited in the file of this patent

UNITED STATES PATENTS

| | | |
|---|---|---|
| 1,127,997 | Jennings | Feb. 9, 1915 |
| 1,354,489 | Johnson | Oct. 5, 1920 |
| 1,909,578 | Franks | May 16, 1933 |
| 1,926,446 | Klosson | Sept. 12, 1933 |